(12) United States Patent
Elliot et al.

(10) Patent No.: US 6,666,760 B2
(45) Date of Patent: Dec. 23, 2003

(54) DEVICE FOR DELIVERING AIR AT THE FRONT OF THE CABIN OF A VEHICLE

(75) Inventors: Gilles Elliot, Courcouronnes (FR); Pascale Petitjean, Neauphle le Vieux (FR); Carine Paumier, Versailles (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/134,735

(22) Filed: Apr. 30, 2002

(65) Prior Publication Data

US 2002/0164941 A1 Nov. 7, 2002

(30) Foreign Application Priority Data

May 4, 2001 (FR) .............................. 01 05985

(51) Int. Cl.[7] .............................................. B60H 1/26
(52) U.S. Cl. ....................................... 454/121; 454/152
(58) Field of Search ................................ 454/121, 127, 454/152, 156

(56) References Cited

U.S. PATENT DOCUMENTS 4,223,754 A * 9/1980 Mizuno et al. ............... 180/90

FOREIGN PATENT DOCUMENTS

| DE | 43 38 099 A1 | 5/1995 |
|---|---|---|
| DE | 199 18 515 A1 | 10/2000 |
| DE | 100 11 932 C1 | 3/2001 |
| FR | 2 541 958 | 9/1984 |
| FR | 2 718 682 | 10/1995 |

* cited by examiner

*Primary Examiner*—Harold Joyce
(74) *Attorney, Agent, or Firm*—Ronald Courtney

(57) ABSTRACT

The invention relates to a device for delivering ventilation air to the front of the cabin (6) of a motor vehicle, this ventilation air being delivered by a delivery box (11) of a heating, ventilation and/or air-conditioning unit, said device comprising at least one ventilation pipe (9) supplying at least one air vent (16a, 16b, 17a, 17b) provided in the dashboard (1), said ventilation pipe (9) being formed in a delivery module (8) which runs transversely under the upper face (2) of the dashboard (1), and splitting downstream in the direction of flow of the ventilation air into at least one "gentle" ventilation pipe (13) which opens onto the, upper face (2) of the dashboard (1) via ventilation orifices (14) of large cross section and into at least one "forced" ventilation pipe (15) which supplies at least one air vent (16a, 16b, 17a, 17b) of small cross section arranged on the dashboard (1) facing the cabin (6). At least one air distribution shutter (21) is provided at the junction between the three pipes (9, 13, 15).

9 Claims, 4 Drawing Sheets

DEVICE FOR DELIVERING AIR AT THE FRONT OF THE CABIN OF A VEHICLE

The invention relates to a device for delivering ventilation air to the front of the cabin of a motor vehicle, this ventilation air being delivered by a delivery box of a heating, ventilation and/or air-conditioning unit, said device comprising at least one ventilation pipe supplying at least one air vent provided in the dashboard and connected to an outlet of said delivery box, the cross section of which is adjusted by a delivery shutter.

In general, the delivery box comprises several outlets for selectively supplying the defrosting pipes, the dashboard ventilation pipes and possibly the pipes for ventilating the lower part of the cabin. The delivery box comprises, for this purpose, distribution shutters controlled from a control panel arranged in the vehicle console or in the central part of the dashboard. The ventilation pipes in the dashboard deliver air to several air vents, particularly the central air vents and the lateral air vents. These air vents are equipped with orientable fins and with a shutter for adjusting the flow rate of the air delivered, these being controlled manually by the driver or the passenger. This shutter for adjusting the flow rate is arranged near the outlet orifice.

The cross sections of these air vents are relatively small and the ventilation air emerges at a speed in excess of 5 m/s in ventilation mode alone or in a combined ventilation/defrosting or ventilation/feet-heating mode. These high speeds cause noises.

In certain vehicles, it has already been proposed for the ventilation air to be delivered through orifices of large cross section distributed in particular on the upper face of the dashboard behind the windshield and the defrosting nozzles. The total surface areas of these orifices are calculated so that the air emerges at a speed below 5 m/s. This mode of ventilation is known as "gentle" as opposed to "forced" ventilation in which the air leaves the vents at a speed in excess of 5 m/s.

Hybrid ventilation devices in which some of the ventilation air is delivered gently by outlets of large cross section distributed over the upper face of the dashboard and some is delivered in a forced way by air vents directed toward the cabin are also known. Each air vent has its own adjusting shutter, so as to allow the driver or the passenger to adjust the flow rate from each vent. The total flow rate of ventilation air is adjusted by a shutter on the delivery box. However, these known devices do not allow ventilation air to be delivered in forced mode only.

The object of the invention is to propose a delivery module such as mentioned in the introduction and which allows the distribution of ventilation air to be adjusted between "gentle" ventilation mode and "forced" ventilation mode.

The object is achieved in that said ventilation pipe is formed in a delivery module which runs transversely under the upper face of the dashboard, in that said ventilation pipe splits downstream in the direction of flow of the ventilation air into at least one "gentle" ventilation pipe which opens onto the upper face of the dashboard via ventilation orifices of large cross section and into at least one "forced" ventilation pipe which supplies at least one air vent of small cross section arranged on the dashboard facing the cabin, and in that at least one air distribution shutter is provided at the junction between the three pipes, said distribution shutter being controlled independently of the delivery shutter.

According to a first embodiment of the invention, the device comprises a single ventilation pipe arranged in the central region of the module and splitting into a single "gentle" ventilation pipe opening via orifices distributed transversely behind the windshield and into two lateral "forced" ventilation pipes arranged symmetrically in the dashboard.

Advantageously, each lateral "forced" ventilation pipe subdivides into a central duct supplying a central air vent and into a lateral duct supplying a lateral air vent.

According to a second embodiment of the invention, the device comprises two ventilation pipes arranged symmetrically in the central region of the module and which are intended to supply ventilation air to the left-hand part and the right-hand part of the cabin respectively, each of these ventilation pipes having its own air distribution shutter.

Advantageously, each ventilation pipe splits into a single lateral "gentle" ventilation pipe opening via orifices distributed transversely behind the windshield and into a single lateral "forced" ventilation pipe.

As a preference, the lateral "forced" ventilation pipe subdivides into a central duct supplying a central air vent and into a lateral duct supplying a lateral supply vent.

According to a third embodiment of the invention, the device comprises four ventilation pipes arranged transversely in the central region of the module, namely two central pipes delivering ventilation air to the lateral regions of the dashboard, and two lateral pipes delivering ventilation air to the left-hand and right-hand central regions of the dashboard respectively.

Advantageously, each ventilation pipe divides into a single "gentle" ventilation pipe opening via orifices distributed transversely behind the windshield and into a single "forced" ventilation pipe and comprises its own air distribution shutter.

As a preference, each central ventilation pipe passes over and to the rear of the "gentle" ventilation pipe supplied by the adjacent lateral ventilation pipe.

The "forced" ventilation pipe supplied by a central ventilation pipe is arranged above and to the rear of the "gentle" ventilation pipe supplied by said central ventilation pipe.

As a preference, the module further comprises a defrosting pipe arranged in the front part of said module.

The module may further comprise two lower lateral pipes for supplying the lower region of the cabin with air.

Other advantages and features of the invention will become apparent from reading the following description which is given by way of example and with reference to the appended figures in which.

Figure 1:
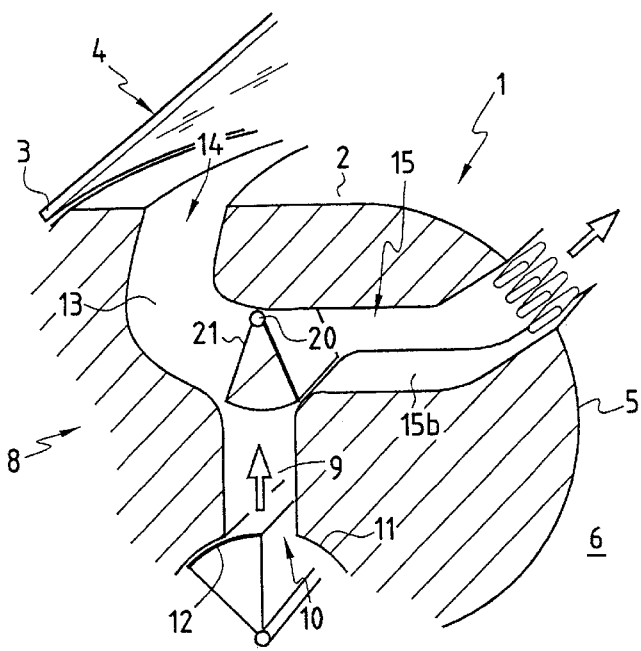
FIG. 1 is a vertical section on I—I of FIG. 2, of an example of a delivery device according to the first embodiment of the invention.
Figure 3:
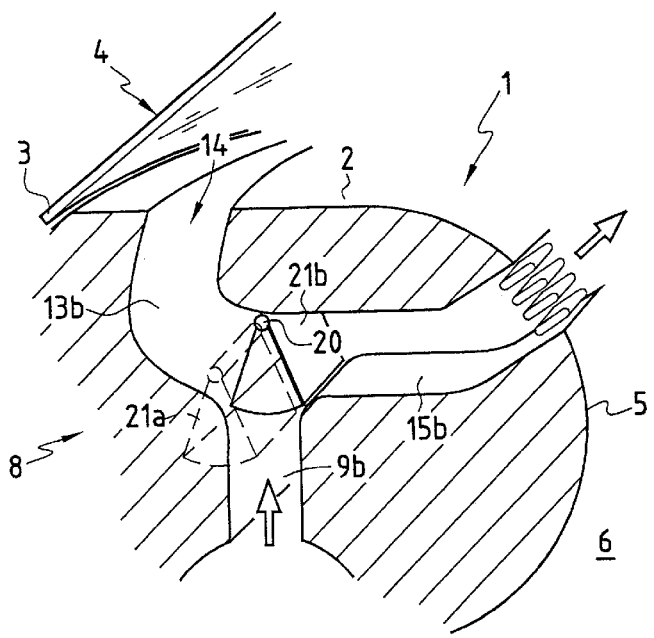
FIG. 3 is a vertical section on III—III of FIG. 4, of a delivery device according to the second embodiment of the invention.
Figure 5:
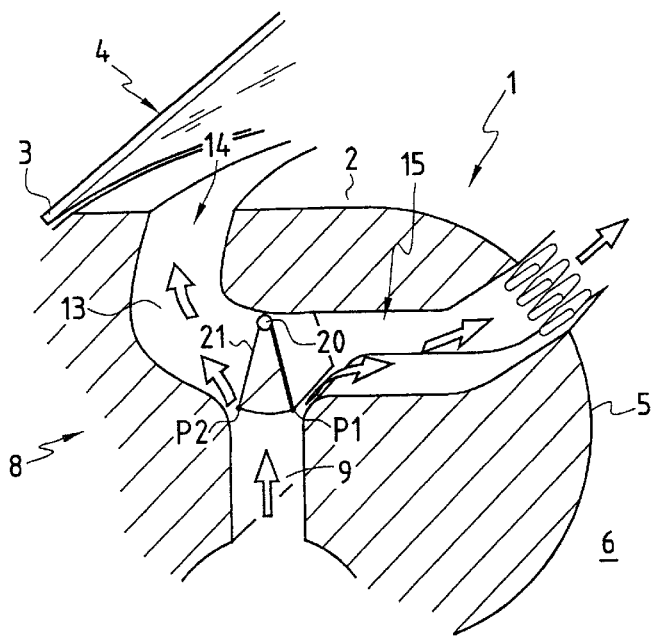
Figure 6:
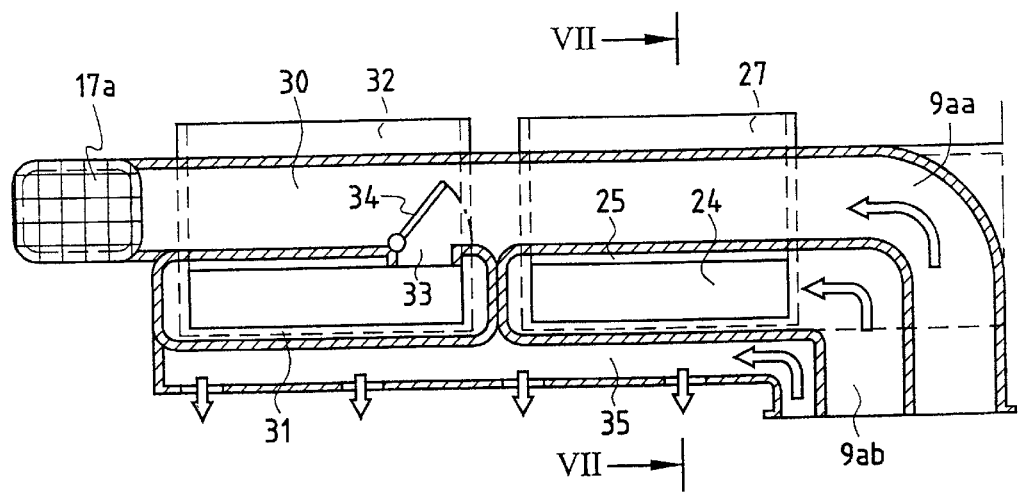
Figure 7:
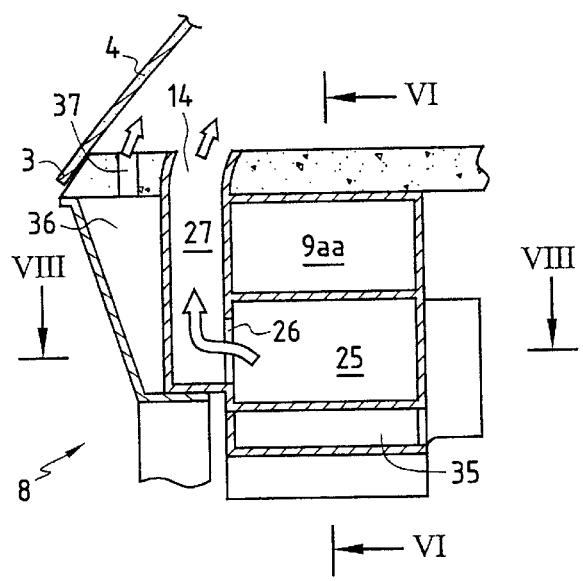
Figure 8:
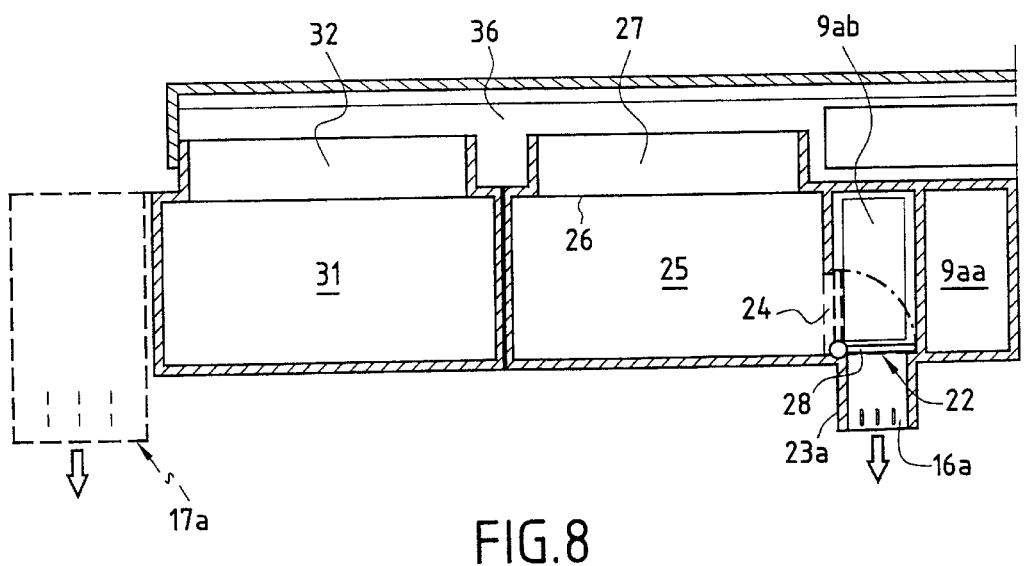

FIG. 5, which is similar to FIGS. 1 and 3, shows an alternative form of embodiment of a shutter for distributing air between "gentle" ventilation and "forced" ventilation, which allows air leaks;

FIG. 6 is a view in vertical cross section on VI—VI of FIG. 7 of the left hand part of a delivery device according to a third embodiment of the invention;

FIG. 7 is a vertical longitudinal section of the same device on VII—VII of FIG. 6; and FIG. 8 is a horizontal section on VIII—VIII of FIG. 7 of the device according to the third embodiment of he invention.

In the drawings, the reference 1 has been used to depict the dashboard of a motor vehicle which comprises an upper face 2 which runs roughly horizontally behind the base 3 of a windshield 4 and a front face 5 arranged facing the cabin 6. Provided in the upper part of the dashboard 1 is a module 8 for delivering ventilation air which runs transversely and which in particular comprises at least one ventilation pipe 9 connected to an outlet 10 of a delivery box 11 of a heating, ventilation and/or air-conditioning unit not shown in the drawings. The cross section of the outlet 10 is adjusted by a delivery shutter 12.

The ventilation pipe 9 runs vertically in the central region of the dashboard 1 above the delivery box 11. This ventilation pipe 9 splits downstream in the direction of flow of the ventilation air into a "gentle" ventilation pipe 13 of large cross section, which opens behind the base 3 of the windshield 4 via a number of orifices 14, the passage cross section of which is also large, and into at least one "forced" ventilation pipe 15 which delivers ventilation air to central air vents 16a, 16b and to lateral air vents 17a, 17b.

The "gentle" ventilation orifices 14 run transversely on the upper face 2 of the dashboard 1, behind the defrosting nozzles, while the air vents 16a, 16b, 17a and 17b are arranged on the front face 5 of the dashboard 1 facing the cabin 6.

Figure 2:
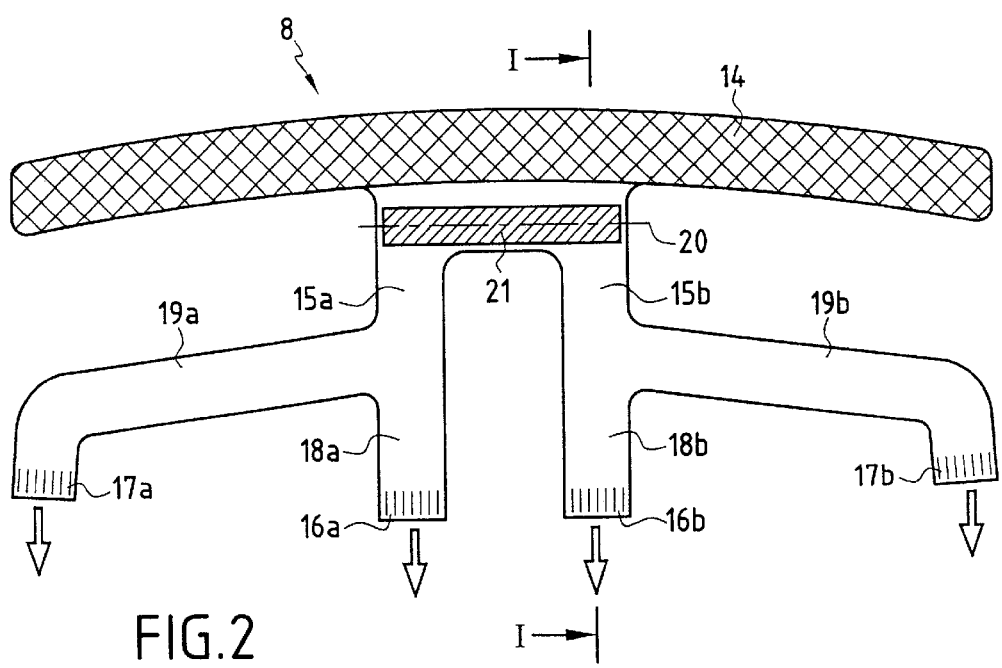
FIG. 2 is a schematic view from above of the delivery device of FIG. 1.

According to the first embodiment of the invention which is depicted in FIGS. 1 and 2, the delivery module 8 comprises a single ventilation pipe 9, a single "gentle" ventilation pipe 13, and two "forced" ventilation pipes 15a, 15b. Each "forced" ventilation pipe 15a, 15b is subdivided into a central duct 18a, 18b, supplying a central air vent 16a, 16b and into a lateral duct 19a, 19b supplying a lateral air vent 17a, 17b.

Mounted so that it can rotate about a transverse axis 20 at the junction between the ventilation pipe 9, the "gentle" ventilation pipe 13 and the "forced" ventilation pipes 15a, 15b is a shutter 21 for distributing air between the "gentle" ventilation pipe 13 and the "forced" ventilation pipes 15a, 15b. This distribution shutter 21 is controlled from the console independently of the position of the delivery shutter 12.

The distribution shutter 21 allows the ventilation air delivered by the ventilation pipe 9 to be distributed between the "gentle" ventilation orifices 14 and the air vents 16a, 16b, 17a and 17b. These air vents are also equipped with orientable fins and with shutters for adjusting the flow rate.

Figure 4:
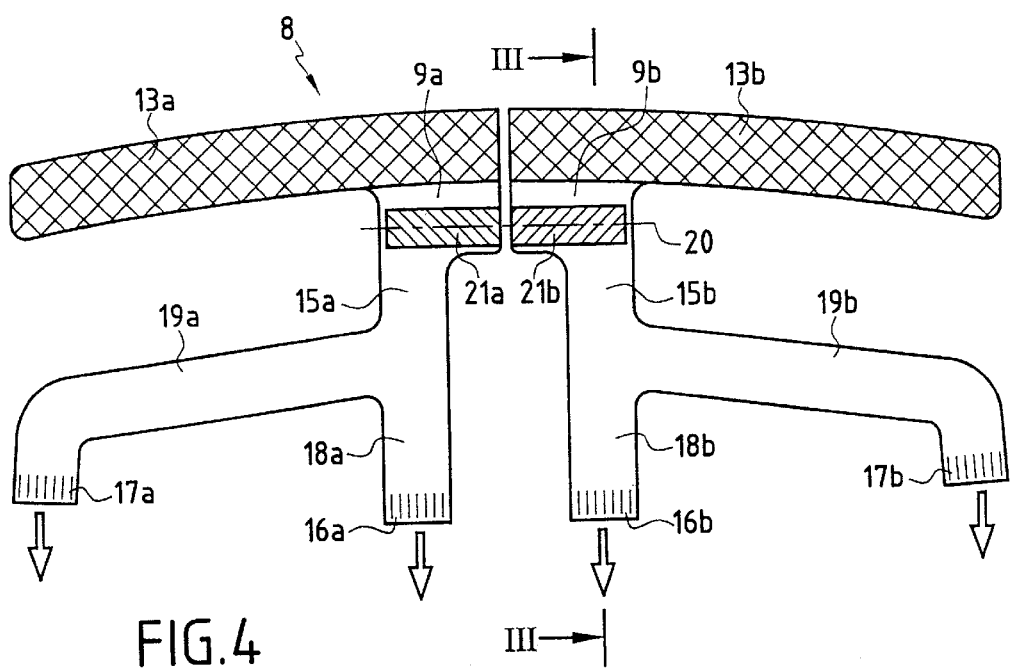
FIG. 4 is a diagrammatic view from above of the delivery device of FIG. 2.

FIGS. 3 and 4 show a second embodiment of the invention. In this second embodiment, the delivery module 8 comprises two ventilation pipes 9a and 9b arranged transversely in the central region of the dashboard, the ventilation pipe 9a being intended to deliver air to the left-hand part of the cabin 6, while the ventilation pipe 9b is intended to deliver air to the right-hand part of the cabin 6.

Each ventilation pipe divides downstream into a "gentle" ventilation pipe 13a, in the case of the ventilation pipe 9a, and 13b, in the case of the ventilation pipe 9b, and into a "forced" ventilation pipe 15a, in the case of the ventilation pipe 9a, and 15b, in the case of the ventilation pipe 9b. As in the first embodiment, the "forced" ventilation pipe 15a subdivides into a central duct 18a which supplies the central air vent 16a, and into a lateral duct 19a which supplies the lateral air vent 17a, and the "forced" ventilation pipe 15b subdivides into a central duct 18b which supplies the central air vent 16b and into a lateral duct 19b which supplies the lateral air vent 17b.

A first distribution shutter 21a is provided at the junction between the ventilation pipe 9a and the ventilation pipes 13a and 15a, and a second distribution shutter 21b is provided at the junction between the ventilation pipe 9b and the ventilation pipes 13b and 15b. These two distribution shutters 21a and 21b are mounted so that they can rotate about a common geometric axis 20. These two shutters 21a and 21b are controlled independently of one another and independently of the position of the delivery shutter 12.

In both of the embodiments described hereinabove, each distribution shutter 21, 21a and 21b is able to move between two extreme positions, namely a first position in which it closes off the entry to the corresponding "gentle" ventilation pipe 13, 13a, 13b and all the air delivered by the corresponding ventilation pipe 9, 9a, 9b is despatched to the corresponding "forced" ventilation pipe, and a second position in which it closes off the entry to the corresponding "forced" ventilation pipe and the cabin 6 is ventilated in gentle mode.

FIG. 5 shows an alternative form of the mounting of one of the distribution shutters, for example 21. The distribution shutter 21 is mounted so that it can move between two extreme positions referenced P1 and P2, in each of which positions a leakage flow rate is allowed to pass through the normally closed-off downstream pipe. The positions P1 and P2 are set according to the weather conditions of the surroundings in which the vehicle is accustomed to running.

FIGS. 6 to 8 show the left-hand part of a dashboard 1, equipped with a delivery module 8, designed to supply ventilation air, independently of one another, to four transverse portions of the cabin 6.

This delivery module 8 comprises four ventilation pipes arranged transversely in the central region of the dashboard. Only the central left-hand ventilation pipe 9aa and the lateral left-hand ventilation pipe 9ab are shown in FIGS. 6 and 7. The central ventilation pipes are intended to deliver ventilation air to the lateral regions of the dashboard 1, and the lateral ventilation pipes are intended to deliver air to the left-hand and right-hand central regions of the dashboard 1.

Each lateral ventilation pipe, for example 9ab, opens, via an orifice 22, into a central ventilation pipe 23a leading to the central air vent 16a, and by an orifice 24 into a left-hand central chamber 25, the front wall of which has an opening 26 leading into a first "gentle" delivery pipe 27 which opens onto the upper face 2 of the dashboard 1 in its left-hand central region. A first distribution shutter 28 allows the orifices 22 and 24 to be closed off selectively.

Each central ventilation pipe, for example the pipe 9aa, is elbowed and runs partly over the left-hand central chamber 25. To the left of the left-hand central chamber 25, this central ventilation pipe 9aa splits into a first lateral ventilation pipe 30 situated in the continuation of the pipe 9aa, and into a second lateral ventilation pipe consisting of a lateral chamber 31 contiguous with the left-hand central chamber 25 and of a second "gentle" delivery pipe 32 which opens onto the upper face 2 of the dashboard 1 in its lateral region. The inlet orifice 33 of the lateral chamber 31 and the inlet of the lateral ventilation pipe 30 may be closed off selectively by a second distribution shutter 34.

As can be seen in FIGS. 6 and 7, the module 8 also comprises, in its lower part, two lower lateral pipes, one to the right and the other to the left, 35, intended to deliver processed air to the lower part of the cabin 6. FIGS. 7 and 8 also show that the module 8 comprises, in its front region, a defrosting pipe 36 which opens at the base of the windshield 4 via defrosting nozzles 37.

The module 8 may be produced by assembling several thermoformed parts, obtained by molding from a synthetic material which gives the end-product sufficient rigidity.

What is claimed is:

1. A device for delivering ventilation air to the front of the cabin of a motor vehicle, this ventilation air being delivered by a delivery box of a heating, ventilation and/or air-conditioning unit, said device comprising at least one ventilation pipe supplying at least one air vent provided in the dashboard and connected to an outlet of said delivery box, the cross section of which is adjusted by a delivery shutter, wherein:

said ventilation pipe is formed in a delivery module which runs transversely under the upper face of the dashboard, said ventilation pipe splits downstream in the direction of flow of the ventilation air into at least one "gentle" ventilation pipe which opens onto the upper face of the dashboard via ventilation orifices of large cross section and into at least one "forced" ventilation pipe which supplies at least one air vent of small cross section arranged on the dashboard facing the cabin, at least one air distribution shutter is provided at the junction between the three pipes, said distribution shutter being controlled independently of the delivery shutter, and two ventilation pipes arranged symmetrically in the central region of the module and which are intended to supply ventilation air to the left-hand part and the right-hand part of the cabin respectively, each of these ventilation pipes having its own air distribution shutter.

2. The device as claimed in claim 1, wherein each ventilation pipe splits into a single lateral "gentle" ventilation pipe opening via orifices distributed transversely behind the windshield and into a single lateral "forced" ventilation pipe.

3. The device as claimed in claim 2, wherein the lateral "forced" ventilation pipe subdivides into a central duct supplying a central air vent and into a lateral duct supplying a lateral vent.

4. A device for delivering ventilation air to the front of the cabin of a motor vehicle, this ventilation air being delivered by a delivery box of a heating, ventilation and/or air-conditioning unit, said device comprising at least one ventilation pipe supplying at least one air vent provided in the dashboard and connected to an outlet of said delivery box, the cross section of which is adjusted by a delivery shutter, wherein:

said ventilation pipe is formed in a delivery module which runs transversely under the upper face of the dashboard, said ventilation pipe splits downstream in the direction of flow of the ventilation air into at least one "gentle" ventilation pipe which opens onto the upper face of the dashboard via ventilation orifices of large cross section and into at least one "forced" ventilation pipe which supplies at least one air vent of small cross section arranged on the dashboard facing the cabin, at least one air distribution shutter is provided at the junction between the three pipes, said distribution shutter being controlled independently of the delivery shutter, and four ventilation pipes arranged transversely in the central region of the module, namely two central pipes delivering ventilation air to the lateral regions of the dashboard, and two lateral pipes delivering ventilation to the left-hand and right-hand central regions of the dashboard respectively.

5. The device as claimed in claim 4, wherein each ventilation pipe divides into a single "gentle" ventilation pipe opening via orifices distributed transversely behind the windshield and into single "forced" ventilation pipe and comprises its own air distribution shutter.

6. The device as claimed in claim 5, wherein each central ventilation pipe passes over and to the rear of the "gentle" ventilation pipe supplied by the adjacent lateral ventilation pipe.

7. The device as claimed in claim 6, wherein the "forced" ventilation pipe supplied by a central ventilation pipe is arranged above and to the rear of the "gentle" ventilation pipe supplied by said central ventilation pipe.

8. The device as claimed in claim 4, wherein the module further comprises a defrosting pipe arranged in the front part of said module.

9. The device as claimed in claim 4, wherein the module further comprises two lower lateral pipes for supplying the lower region of the cabin with air.

* * * * *